United States Patent
Kleyer et al.

(10) Patent No.: US 11,261,641 B2
(45) Date of Patent: Mar. 1, 2022

(54) RETAINING ELEMENT FOR A VEHICLE SIDE WINDOW THAT CAN BE RAISED AND LOWERED

(71) Applicant: SAINT-GOBAIN GLASS FRANCE, Courbevoie (FR)

(72) Inventors: Dieter Kleyer, Würselen (DE); Jan-Uwe Oltrogge, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 11 days.

(21) Appl. No.: 16/772,336

(22) PCT Filed: Oct. 29, 2018

(86) PCT No.: PCT/EP2018/079560
§ 371 (c)(1),
(2) Date: Jun. 12, 2020

(87) PCT Pub. No.: WO2019/115078
PCT Pub. Date: Jun. 20, 2019

(65) Prior Publication Data
US 2021/0079708 A1    Mar. 18, 2021

(30) Foreign Application Priority Data
Dec. 12, 2017    (EP) .................................... 17206572

(51) Int. Cl.
*B60J 1/16* (2006.01)
*E05F 11/38* (2006.01)
(Continued)

(52) U.S. Cl.
CPC ............ *E05F 11/385* (2013.01); *B60J 1/006* (2013.01); *B60J 1/17* (2013.01); *B62D 65/06* (2013.01);
(Continued)

(58) Field of Classification Search
CPC . E05F 11/385; B60J 1/006; B60J 1/17; B62D 65/06; E05D 15/165;
(Continued)

(56) References Cited

U.S. PATENT DOCUMENTS 3,653,157 A * 4/1972 Casebolt .................. E06B 3/02
                                                49/411
4,530,186 A * 7/1985 Guillon .................... B60J 10/30
                                                428/122
(Continued)

FOREIGN PATENT DOCUMENTS

DE    11 92 551 B    5/1965
DE    43 40 363 A1   6/1995
(Continued)

OTHER PUBLICATIONS

International Search Report as issued in International Patent Application No. PCT/EP2018/079560, dated Nov. 29, 2018.

*Primary Examiner* — Jerry E Redman
(74) *Attorney, Agent, or Firm* — Pilisbury Winthrop Shaw Pittman LLP

(57) ABSTRACT

A retaining element for a side window of a vehicle, includes a first securing section and a first contact section connected thereto for securing to a first surface of the side window, a second securing section and a second contact section connected thereto for securing to a second surface of the side window, wherein the first and second securing sections are connected to one another opposite the contact sections via a hinge section such that the first securing section together with the first contact section and the second securing section together with the second contact section is pivotable relative to one another, whereby the retaining element is openable and closable. In the closed state, the securing sections are in surface contact with one another and, together, are suitable (Continued)

for securing to the vehicle and the contact sections are suitable for securing to two opposing surfaces of the side window.

19 Claims, 4 Drawing Sheets

(51) Int. Cl.
| | | |
|---|---|---|
| *B60J 1/00* | (2006.01) | |
| *B60J 1/17* | (2006.01) | |
| *B62D 65/06* | (2006.01) | |
| *E05D 15/16* | (2006.01) | |

(52) U.S. Cl.
CPC ........ *E05D 15/165* (2013.01); *E05Y 2201/64* (2013.01); *E05Y 2900/55* (2013.01)

(58) Field of Classification Search
CPC ............. E05Y 2201/64; E05Y 2900/55; E05Y 2600/526; E05Y 2600/53; E05Y 2600/60
USPC ..................................... 49/374, 375
See application file for complete search history.

(56) References Cited

U.S. PATENT DOCUMENTS

| | | | | |
|---|---|---|---|---|
| 4,866,895 A * | 9/1989 | Hlavaty | ................... | B60J 10/75 |
| | | | | 52/208 |
| 4,987,699 A * | 1/1991 | Gold | ........................ | B60J 10/34 |
| | | | | 49/375 |
| 5,363,595 A * | 11/1994 | Wirsing | ................. | E05F 11/385 |
| | | | | 49/375 |
| 5,546,704 A * | 8/1996 | Maruoka | ................... | B60J 1/17 |
| | | | | 49/375 |
| 5,778,599 A * | 7/1998 | Saito | ..................... | E05F 11/385 |
| | | | | 49/375 |
| 5,966,872 A * | 10/1999 | Wasek | .................. | E05F 11/385 |
| | | | | 49/348 |
| 6,425,207 B1 * | 7/2002 | Davis | .................... | E05F 11/385 |
| | | | | 49/349 |
| 7,584,573 B2 * | 9/2009 | Yoshii | ................... | E05F 11/385 |
| | | | | 49/372 |
| 9,822,571 B2 * | 11/2017 | Reinke | .................. | E05F 11/385 |
| 2005/0072077 A1 | 4/2005 | Yoshii et al. | | |
| 2006/0048452 A1 * | 3/2006 | Sweeney | ............... | E05F 11/385 |
| | | | | 49/374 |
| 2008/0099647 A1 * | 5/2008 | Shimozaki | ........... | E05F 11/385 |
| | | | | 248/309.2 |
| 2010/0037543 A1 * | 2/2010 | Pulcini | ................. | E05F 11/385 |
| | | | | 52/208 |
| 2019/0178019 A1 * | 6/2019 | Takahashi | .................. | B60J 1/17 |
| 2019/0226261 A1 * | 7/2019 | Taubmann | ............ | E05F 11/385 |
| 2019/0248216 A1 * | 8/2019 | Sauvinet | ............... | B32B 17/061 |

FOREIGN PATENT DOCUMENTS

| | | |
|---|---|---|
| DE | 201 01 057 U1 | 6/2001 |
| EP | 1 299 611 A2 | 4/2003 |
| EP | 1 745 190 A1 | 1/2007 |
| EP | 1 935 557 A1 | 6/2008 |
| EP | 1 935 558 A1 | 6/2008 |
| EP | 1 936 087 A1 | 6/2008 |
| EP | 1 936 088 A1 | 6/2008 |
| JP | S57-187482 A | 11/1982 |
| JP | H09-175173 A | 7/1997 |
| JP | 2005-097878 A | 4/2005 |
| JP | 2007-146458 A | 6/2007 |
| JP | 2008-110632 A | 5/2008 |
| JP | 2015-214817 A | 12/2015 |
| JP | 2017-036568 A | 2/2017 |
| RU | 120924 U1 | 10/2012 |
| SU | 1119865 A1 | 10/1984 |
| WO | WO 01/098613 A2 | 12/2001 |
| WO | WO 2005/098187 A1 | 10/2005 |
| WO | WO 2015/170553 A1 | 11/2015 |

* cited by examiner

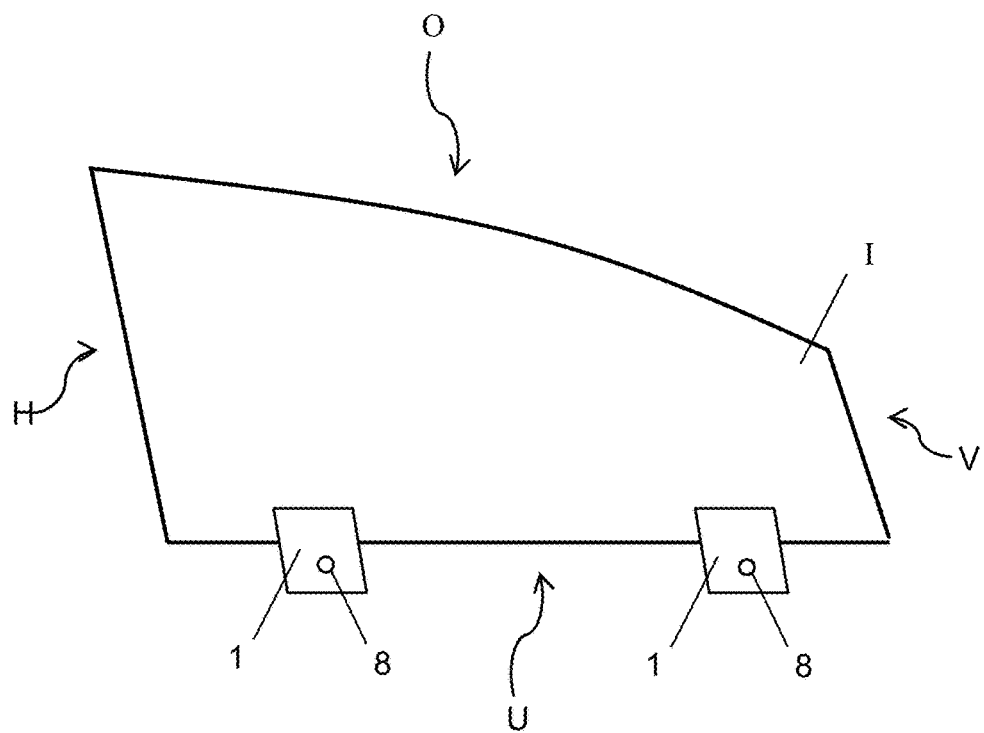
Fig. 1
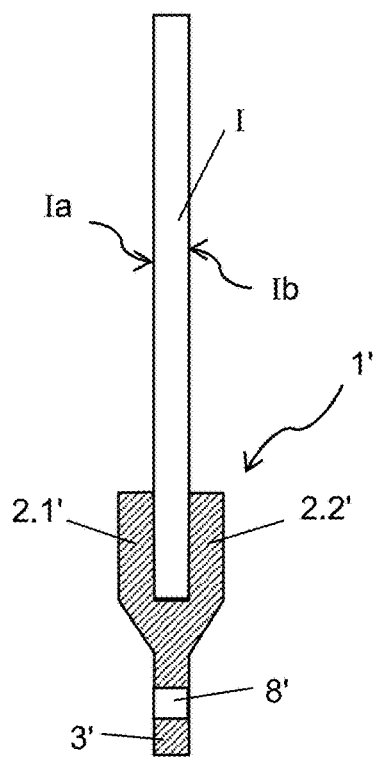
Fig. 2 – Prior Art

RETAINING ELEMENT FOR A VEHICLE SIDE WINDOW THAT CAN BE RAISED AND LOWERED

CROSS-REFERENCE TO RELATED APPLICATIONS

This application is the U.S. National Stage of PCT/EP2018/079560, filed Oct. 29, 2018, which in turn claims priority to European patent application number 17 206 572.4 filed Dec. 12, 2017. The content of these applications are incorporated herein by reference in their entireties.

FIELD

The invention relates to a retaining element for a side window of a vehicle, a side window equipped therewith as well as a method for its production and use thereof.

BACKGROUND

Motor vehicles typically have openable side windows. Such side windows are provided with a side pane that can be moved by substantially vertical displacement (i.e., raising and lowering), by which means the side window can be opened and closed. In order to be able to move the window, it is connected to a mechanism in the interior of the vehicle body.

For connecting the side window to the raising and lowering mechanism, the side window can be provided with one or a plurality of holes in the region of its lower edge. Alternatively, one or a plurality of retaining elements can also be attached, in particular glued, to the side window in the region of the lower edge. Such retaining elements conventionally have a substantially Y-shaped cross-section with two contact sections that are glued to the two surfaces of the side window and to which a common securing section is connected via a step in each case. The securing section is connected to the lower edge of the side window and is equipped with a hole for connecting to the raising and lowering mechanism. Such Y-shaped retaining elements are known, for example, from EP1936088A1, EP1936087A1, EP1935557A1, EP1935558A1, EP1745190A1, EP1299611A2, and DE4340363A1.

DE1192551B discloses a substantially Y-shaped retaining element, wherein the securing section is, so to speak, divided into two parts, each of which is connected to a contact section and which are connected to one another opposite the contact sections via a connecting section. This configuration generates a certain spring section that presses the contact sections against the pane surfaces. Otherwise, however, the retaining element is essentially rigid. A similar retaining element is also known from JPS57187482A.

DE20101057U1 discloses a two-part retaining element, wherein the two parts are inserted into each other at the end facing away from the pane to create a hinge-like connection. The retaining element is secured by clamping onto the pane, with the contact section of one part having a pin-like projection that is guided through a hole near the lower edge of the pane and engages in a recess in the other part.

Typically, prior art Y-shaped retaining elements are placed on the lower edge of the side window. This is done in a first prior art design after the adhesive is introduced into the open gap of the retaining elements, whereupon the retaining elements are usually pushed onto the pane in a clamping manner. As a result, the excess adhesive swells uncontrolled between the lower edge of the pane and the retaining element. In a second prior art, the adhesive is introduced after the retaining element has been positioned on the side window. The adhesive is injected, in particular, through filling openings in the contact sections. To prevent escape of the adhesive from the intermediate space between the contact section and the pane surface, it is necessary to seal this intermediate space with a sealing device that rests against the side edges of the contact sections. The adhesive is then injected until the entire intermediate space is filled and cured. The use of the sealing element makes the attachment of the retaining element complex.

The orientation of the attached retaining element depends essentially on the curvature of the pane in the edge region, which, for its part, is subject to certain production-related variation. As a result of the securing section extending lever-like from the lower edge of the pane, the position of the connection to the raising and lowering mechanism is also subject to variation and can sometimes deviate significantly from the intended position. This can make assembly of the product impossible.

Consequently, there is a need for improved retaining elements for vehicle side windows and improved methods for their attachment that overcome the aforementioned disadvantages. The object of the present invention is to provide such improved retaining elements and methods. The retaining elements should be able to be attached as quickly and as easily as possible (in particular, without the use of a sealing device), enable high flexibility of positioning, and adhere securely and stably to the side window.

SUMMARY

The object of the present invention is accomplished according to the invention by a retaining element in accordance with claim 1. Preferred embodiments are apparent from the dependent claims.

In an aspect of the invention, there is provided a retaining element for a side window of a vehicle, comprising:
- a first securing section and a first contact section connected thereto for securing to a first surface of the side window,
- a second securing section and a second contact section connected thereto for securing to a second surface of the side window,
- wherein the first securing section and the second securing section are connected to one another opposite the contact sections via a hinge section such that the first securing section together with the first contact section and the second securing section together with the second contact section are pivotable relative to one another, whereby the retaining element can be opened and closed,
- wherein, in the closed state,
- the first and second securing sections are in surface contact with one another and, together, are suitable for securing to the vehicle, and
- the first and second contact sections are suitable for securing to two opposing surfaces of the side window.

In another aspect of the invention, there is provided a side window for a vehicle, having a first surface, a second surface opposite thereto, and a lower edge, and having at least one retaining element attached in the region of the lower edge as described herein, wherein, by means of an adhesive, the first contact section is secured to the first surface and the second contact section is secured to the first surface.

In yet another aspect of the invention, there is provided a method for producing a side window having a retaining element for a vehicle, comprising:

provrding a retaining element as described herein and a side window having a first surface, a second surface opposite thereto, and a lower edge, applying an adhesive to the contact sections of the retaining element in the open state, and closing the retaining element around a region of the lower edge of the side window, wherein the first contact section is connected to the first surface and the second contact section is connected to the second surface via the adhesive.

In another aspect of the invention, there is provided a method comprising utilizing a side window as described herein as an openable side window of a motor vehicle.

BRIEF DESCRIPTION OF THE DRAWINGS

In the following, the invention is explained in detail with reference to drawings and exemplary embodiments. The drawings are a schematic representation and not to scale. The drawings in no way restrict the invention.

They depict:

FIG. 1 a plan view of a side window with two generic retaining elements,

FIG. 2 a cross-section through a prior art retaining element,

DETAILED DESCRIPTION

Figure 3:
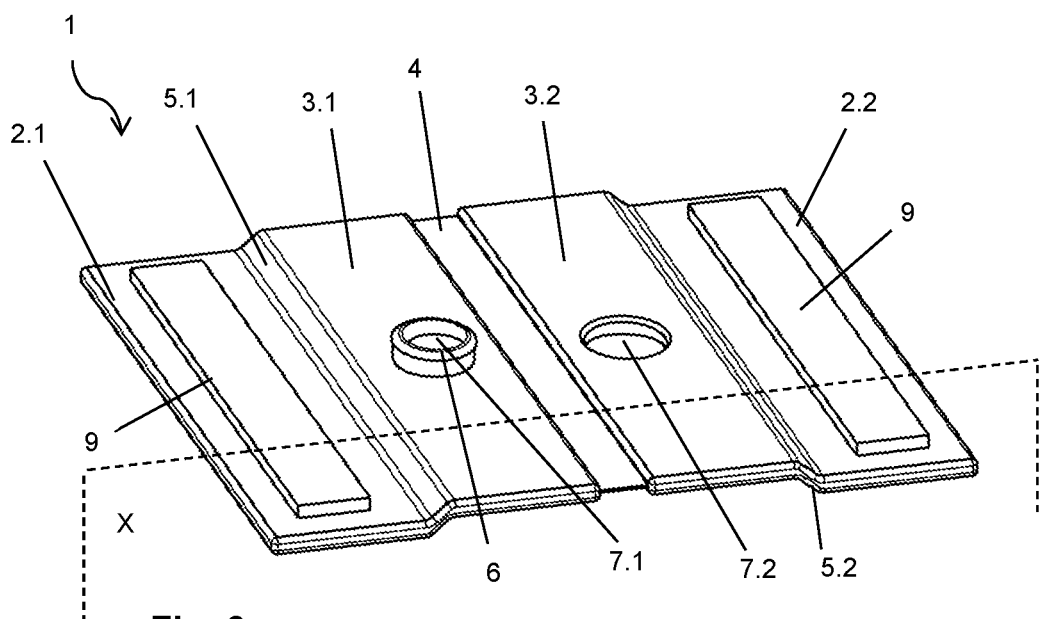
FIG. 3 a perspective view of an embodiment of the retaining element according to the invention in the open state, FIG. 4 the retaining element of FIG. 3 during closing and attachment to the side window, FIG. 5 the retaining element of FIG. 3 attached to the side window, FIG. 6 a cross-section through an embodiment of the retaining element according to the invention in an open state, FIG. 7 a cross-section through two embodiments of the retaining element according to the invention in a closed state, and FIG. 8 a flow chart of an embodiment of the method according to the invention.

The retaining element according to the invention for a side window of a vehicle comprises a first securing section and a first contact section rigidly connected thereto, provided for securing to a first surface of the side window. The retaining element also comprises a second securing section and a second contact section rigidly connected thereto, provided for securing to a second surface of the side window opposite the first surface. The two securing sections are connected to another via a hinge section, secured in each case to the edge of the two securing sections, which faces away from the associated contact section. In other words, the first securing section and the second securing section are connected to one another opposite the contact sections via a hinge section. The hinge section is bendable and makes it possible for the part of the retaining element consisting of the first securing section and the first contact section to pivot relative to the other part of the retaining element consisting of the second securing section and the second contact section. Because of the fact that the first securing section together with the first contact section and the second securing section together with the second contact section can be pivoted relative to one another, the retaining element can be opened and closed. In the closed state, the securing sections are in surface contact with one another and are, together, suitable for securing to the vehicle. The two individual securing sections thus form, so to speak, a common securing section via which the retaining element can be connected to the raising and lowering mechanism within the vehicle body. The two contact sections are, in the closed state, suitable for securing to two opposing surfaces of the side window and are arranged opposite one another for this purpose.

In the closed state, the retaining element according to the invention thus has a roughly Y-shaped cross-section, as is essentially already also known from prior art retaining elements. However, in contrast to these, the retaining element according to the invention is not an overall rigid component but can be opened or folded apart before assembly. In the open state, for example, the surfaces of the contact sections that are intended to adhere to the side window can be provided with a portion of adhesive. Subsequent injection of adhesive is thus unnecessary. The retaining element is attached to the side window by closing it around the lower edge of the side window. With suitable dimensioning and positioning of the portion of adhesive, no adhesive escapes from the intermediate spaces between the contact sections and the pane surface such that sealing of the intermediate spaces can be dispensed with. In addition, this type of assembly ensures a high degree of flexibility in terms of the orientation of the retaining element. Thus, for example, the retaining element can be automatically positioned before closing such that the relative position of the common securing section corresponds to the desired ideal position, while any deviations in the curvature of the pane are compensated by a suitably thick portion of adhesive. These are major advantages of the present invention.

The retaining element according to the invention can, alternatively, be described starting from a prior art retaining element as a retaining element for a side window of a vehicle, comprising two opposing contact sections for securing to the opposing primary surfaces of the side window in the region of its lower edge, and a securing section, which connects (typically via step sections) to both contact sections. In contrast to a prior art Y-shaped retaining element, the securing section is not solid, but is divided in two in the longitudinal direction, with each part of the securing section connected to only one contact section. The two parts of the securing section are connected to one another via a hinge section, which is, in each case, secured to that edge of the two securing subsections that faces away from the associated contact section. The two securing subsections with their respective contact section can be folded apart around the hinge section as an axis of rotation, as a result of which the retaining element can be opened.

In the context of the invention, the open and the closed state of the retaining element are stable without action of external forces. The transition from the open to the closed state and vice versa thus requires an external force. Bending an elastic retaining element, which returns to its original state without action of external forces, for example, as a result of internal spring force, is not an open state in the context of the invention and does not enable convenient application of the adhesive, as in the case of the present invention. Particularly preferably, the retaining element can be brought nondestructively into an open state in which the contact sections are arranged in one plane. Thus, the retaining element can be placed on a support with upward facing contact surfaces in order to apply the adhesive.

The first and the second securing section have a hole (mounting hole), preferably in each case, wherein the hole of the first securing section and the hole of the second securing section coincide in the closed state of the retaining element such that a passage extends through the retaining element. This passage through the common securing section formed by the two securing sections resting against one another is provided for securing the retaining element to the vehicle, in particular, to the raising and lowering mechanism of the side window. Ideally, in the closed state, the two holes coincide concentrically.

The holes of the securing sections and the resulting passage through the retaining element in the closed state are usually essentially circular, for which most prior art securing systems are designed. When the holes coincide concentrically, the size of the passage corresponds to the size of the holes if both holes are the same size or to the size of the smaller hole if the two holes have different sizes. However, depending on the requirements in the individual case, the holes and the passage can also have any other shape, for example, an elliptical shape or even an irregular shape. The size of the passage is usually at least 20 $mm^2$, in particular from 20 $mm^2$ to 2000 $mm^2$, preferably from 80 $mm^2$ to 700 $mm^2$. The passage is ideally roughly circular with a diameter from 5 mm to 50 mm, preferably from 10 mm to 30 mm.

The two securing sections can, in the closed state, contact one another directly or indirectly, when they are, for example, glued together by a layer of adhesive. Preferably, the two securing sections contact one another directly. In a preferred embodiment, the two securing sections are locked together. Thus, advantageously, the stability and the positional accuracy of the retaining element is further increased. For this purpose, the second securing section is provided with a hole, into which a guiding or latching element arranged on the first securing section, for example, a mandrel or a latching hook, is inserted. In an advantageous embodiment, the mounting holes in the securing sections are also used for latching. In this case, the hole of the first securing section is surrounded circumferentially or intermittently by at least one guide element, which, in the closed state of the retaining element, is inserted into the hole of the second securing section or is guided through the hole of the second securing section. The at least one guide element is preferably implemented as a mandrel or as a latching hook. The guide element preferably rests against the circumferential side edge of the hole of the second securing section, thereby preventing lateral displacement of the securing sections relative to one another. In the embodiment with a latching hook, the retaining element is additionally stabilized in the closed state.

Typically, the contact sections and the securing sections have the same material thickness. In this case, at least one securing section must be offset relative to the associated contact section since, in the installed state, the contact sections are spaced apart from another by the side window and the securing sections are in contact with one another. The offset is preferably produced by a step section via which at least one contact section and the securing section associated therewith are connected to one another. To produce the offset, the angles between the step section and the contact section and the angles between the step section and the securing section are greater than 0° and less than 180°, typically greater than or equal to 45° and less than 180°. In a particularly preferred embodiment, both contact sections are connected to the respective associated securing section via a step section in each case, wherein the step sections cause the contact sections to be offset relative to the securing sections. In particular, the two step sections have the same geometry, in particular length and angle relative to the adjacent sections. The first sub-element of the retaining element (first securing section, first step section, and first contact section) and the second sub-element of the retaining element (second securing section, second step section, and second contact section) are then mirror symmetrical to one another. This has the advantage that, in the installed position, the securing sections are arranged centrally between the contact sections and in the plane of the side window, which is advantageous in terms of the position of the center of gravity and the space required in the vehicle body.

The retaining element is preferably made of a metal, a metal alloy, or a plastic, particularly preferably aluminum, steel, stainless steel, or thermoplastics with or without glass fibers, glass beads, or similar reinforcements as well as blends thereof with additional plastics. Suitable thermoplastics are, for example, polyamides (PA), polybutylene terephthalates (PBT), or polyethylene terephthalate (PET). The retaining element is most particularly preferably made of aluminum, PET, or polyamide 66. Suitable materials are, for example, available under the tradenames Technyl, Zytel, Ultramid, Schulamid, Ultradur, Arnite, Duranex, Crastin, Bergadur, Pocan, or Grivor. Also conceivable are combinations of the materials mentioned, for example, contact and securing sections made of plastic, connected to one another via a hinge section made of aluminum, or vice versa. Preferably, however, the entire retaining element is made of the same material. If the retaining element is made of a plastic, this plastic is preferably glass-fiber-reinforced or carbon-fiber-reinforced. The retaining element is preferably implemented in one piece. However, in principle, a multipart design is also possible, with the individual sub-elements connected to one another, for example, by gluing, clamping, screwing, riveting, soldering, or welding. For frameless side windows, retaining elements made of metals or metal alloys are preferable due to their greater stability. For side windows including frames, retaining elements made of plastic are preferred due to their lower weight—the lower stability of the plastic retaining elements compared to metal retaining elements is compensated here, in the closed state of the window, by the stabilizing effect of the frame.

The contact sections and the securing sections are plate-like, typically, essentially rectangular, although other shapes are also conceivable. The material thickness of the securing sections and the contact sections and, optionally, the step sections is preferably from 1 mm to 10 mm, particularly preferably from 2 mm to 5 mm, for example, 3.5 mm. This provides good stability without requiring excessive space and excessive material. Preferably, the contact sections, the securing sections, and, optionally, the step sections have the same material thickness.

The width of the contact sections, the securing sections, and, optionally, the step sections is preferably from 1 cm to 100 cm, particularly preferably from 2 cm to 15 cm, for example, 10 cm. This provides good stability; in particular, the contact sections provide sufficiently large adhesion surfaces for connecting to the side window.

The length (or height) of the contact sections is preferably from 1 cm to 6 cm, particularly preferably from 2 cm to 4 cm, for example, 3 cm. This provides good stability; in particular, the contact sections provide sufficiently large adhesion surfaces for connecting to the side window. The area of the contact sections is preferably from 5 $cm^2$ to 500 $cm^2$, particularly preferably from 10 $cm^2$ to 50 $cm^2$, for example, 30 $cm^2$.

The length (or height) of the securing sections is preferably from 2 cm to 15 cm, particularly preferably from 4 cm to 10 cm, for example, 8 cm. In this range, the securing sections are particularly advantageously suited for connecting to conventional mechanisms for raising and lowering the side window. The length of the step sections is, for example, from 2 mm to 10 mm.

The material thickness of the hinge section is typically significantly lower than that of the other sections in order to ensure the necessary flexibility. The material thickness of the hinge section is preferably from 0.1 mm to 2.5 mm, particularly preferably from 0.1 mm to 1 mm, most particularly preferably from 0.2 mm to 0.5 mm, for example, 0.25 mm. The length of the hinge section is, for example, from 5 mm to 15 mm. The width of the hinge section preferably corresponds to at least 60%, particularly preferably at least 80% of the width of the securing sections in order to achieve sufficient stability and positioning accuracy during folding. Most particularly preferably, the width of the hinge section corresponds to the width of the securing sections.

In the context of the invention, "width" refers to the dimension along the lower edge of the side window in the installed position. "Length" (or height) means the dimension perpendicular thereto, which is arranged substantially parallel to the plane of the side window in the installed position. The contact area of a contact section to the side window, for example, is the product of the length and width of the contact section. The material thickness is the dimension perpendicular to the plane of the side window in the installed position.

The securing sections and the contact sections can be planar. The curvature of the side window is then compensated by the layer of adhesive. Alternatively, however, the contact sections, on the one hand, and the securing sections, on the other, can also be curved complementary to one another and, thus, be adapted, for example, to the curvature of the side window and reproduce it, and, in the case of the securing sections, continue it.

The invention also includes a side window with a retaining element. The side window is intended, as a vehicle side window, for separating a vehicle interior from an external environment. The side window has an upper edge, a lower edge, a front edge, and a rear edge. The side window also has a first surface (primary surface) and a second surface (primary surface) opposite the first surface, between which said edges extend. At least one retaining element according to the invention is attached to the side window in the region of the lower edge. This means that the retaining element covers a region of the lower edge and regions of the surfaces of the side window adjacent thereto. The first contact section of the retaining element is adhesively secured to the first surface of the side window, and the second contact section is adhesively secured to the second surface of the side window, with the adhesive connection made by means of an adhesive. Typically, the lower edge of the side window is provided with two retaining elements.

The retaining element is preferably adhesively secured to the side window exclusively by the adhesive. The side window is in particular not provided with one or a plurality of holes or bores through which projections or pins of the retaining element are guided for a clamping connection. The contact surfaces are, consequently, preferably planar or in the form of a curved surface, without local projections, pins, or receptacles for such projections or pins.

"Upper edge" refers to the side edge of the side window that points upward in the installed position. "Lower edge" refers to the side edge that points downward toward the ground in the installed position. "Front edge" refers to the side edge that is oriented forward in the direction of travel. "Rear edge" refers to the side edge that is oriented backward in the direction of travel.

The side window according to the invention is preferably an openable, in particular raisable and lowerable, side window of a motor vehicle, in particular of a passenger car. This means a pane for a side window that can be opened and closed again by substantially vertical displacement of the side window into the car body. Typically, such windows have a plurality of, in particular two, retaining elements that are mounted in the region of the lower edge, where they are hidden in the vehicle body in the open state and also in the closed state of the window. Each retaining element has a passage, provided for connecting to a raising mechanism arranged in the vehicle body, typically a vehicle door, in order to secure the pane, in particular by inserting a securing section of the raising mechanism, for example, a securing pin, into the passage. The side window can be frameless or framed. A framed side window has a complete body frame around the window opening such that, in the closed state, all side edges of the side window are overlapped within the vehicle body—when raised, the side window is, so to speak, guided into the body frame. In the case of a frameless side window, there is no such body frame. Instead, the upper edge, the front edge, and the rear edge of the side window are exposed in the closed state.

The first contact section is secured to the first surface of the side window via a first adhesive layer; the second contact section, to the second surface of the side window via a second adhesive layer. The thickness of each adhesive layer is preferably from 0.5 mm to 5 mm, particularly preferably from 1 mm to 4 mm. Prior art retaining elements are typically secured to the side window via adhesive layers of approx. 1 mm thickness in each case. In an advantageous embodiment, thicker adhesive layers are used, preferably with a thickness of 2 mm to 4 mm. This has the advantage that variation of the edge curvature of the side windows can be better compensated by the thicker adhesive layer. The precise orientation of the retaining element can, consequently, be more freely selected such that the securing sections can be arranged more precisely in the desired position regardless of the edge curvature of the side window. In terms of the positioning of the passage for securing to the raising mechanism, variations within a production series can thus be reduced. The thickness of the adhesive layers is determined by the distance of the contact sections from one another in the closed state (typically determined by the design of the step sections) and the thickness of the side window, which must accordingly be taken into account during designing of the retaining element for a particular type of side window.

In a preferred embodiment, the adhesive is a high-modulus adhesive. The modulus of elasticity of the adhesive is preferably at least 20 MPa, particularly preferably at least 150 MPa, in particular at least 300 MPa, most particularly preferably from 400 MPa to 600 MPa. This ensures special stability of the connection of the side window to the retaining element. This advantage is particularly significant in the case of frameless side windows, in which the connection between the side window and the retaining element is particularly stressed, for example, by forces acting in the direction of the rear edge caused by the wind. Suitable high-modulus adhesives are, for example, polyurethane, acrylate, or epoxy adhesives.

In an advantageous embodiment, the adhesive is a fast curing adhesive such that direct demolding is possible without further stabilization measures. Fast curing can be achieved by mixing two components. Other ways are curing by introducing energy from the outside, for example, by heat or light. The so-called "open time" of the two component adhesive is between 0.5 min and 10 min, preferably between 1 min and 5 min. The curing time or setting time of the adhesive until achieving sufficient internal strength is less than 10 min, preferably from 1 min to 5 min. This has the advantage that the position of the retaining element relative to the side window is quickly fixed such that stabilization measures after attachment of the retaining element can be dispensed with. The adhesive can, however, also be a slow curing adhesive.

The side window is, as usual for a vehicle window, preferably curved such that the interior-side surface is concave and the exterior-side surface is convex. "Exterior-side surface" refers to the surface that faces the outside environment in the installed position. "Interior-side surface" refers to the surface that faces the interior in the installed position.

In one embodiment, the side window is single-pane safety glass (ESG). In this case, the side window is made of a single glass pane that is thermally or chemically toughened (tempered). The thickness of the glass pane is preferably from 2 mm to 5 mm.

In another embodiment, the side window is a laminated pane (VSG: laminated safety glass). The laminated pane comprises a first glass pane and a second glass pane that are joined to one another via a thermoplastic intermediate layer. The panes can also be referred to as outer pane and inner pane: the inner pane facing the interior in the installed position and the outer pane facing the external environment in the installed position. The exposed surfaces of the side window to which the retaining element is bonded are the surfaces of the individual panes that face away from the intermediate layer, i.e., exterior-side surface of the outer pane and the interior-side surface of the inner pane. The outer pane and the inner pane preferably have a thickness from 1 mm to 5 mm, wherein the thickness of the two panes can be the same (symmetrical panes) or also different (asymmetrical panes). The thickness of the intermediate layer is preferably from 0.3 mm to 2 mm, particularly preferably from 0.5 mm to 1 mm. The intermediate layer is typically made of a polymer film, preferably made of or based on polyvinyl butyral (PVB), ethylene vinyl acetate (EVA), or polyurethane (PU). To improve the thermal comfort in the vehicle, the intermediate layer can be made of a noise-reducing polymer film, typically comprising at least three plies, wherein the middle ply has higher plasticity or elasticity than the outer plies surrounding it, for example, as a result of a different plasticizer content.

The glass pane or glass panes is/are preferably made of soda lime glass, as is customary for window panes. The glass panes can be clear and colorless, but also tinted, cloudy, or colored.

The invention also includes a vehicle with a raising mechanism for an openable side window arranged within the car body and a side window according to the invention, wherein the raising mechanism is attached to the securing sections of the retaining element, preferably via a holder in the passage through the securing sections.

The invention also includes a method for producing a side window having a retaining element for a vehicle. Provided are at least one retaining element according to the invention as well as a side window with a first surface, a second surface opposite thereto, and a lower edge. An adhesive is applied to the contact sections in the open, i.e., unfolded, state of the retaining element. More precisely, the adhesive is applied to the adhesive surfaces of the contact sections, which are provided for connecting to the side window and, which face one another in the closed state of the retaining element. The retaining element is then closed, i.e., folded, around a region of the lower edge of the side window. This means that the retaining element is closed such that a region of the first surface of the side window, a region of the second surface of the side window, and the region of the lower edge that extends between said regions of the surfaces, are arranged between the contact sections. The first contact section is connected to the first surface and the second contact section is connected to the second surface of the side window via the adhesive.

In a preferred embodiment of the method, the adhesive is applied only to a central region of the adhesive surfaces of the contact sections to be connected to the side window. The adhesive has a distance from the side edges of the contact sections of at least 2 mm, preferably from 2 mm to 10 mm. Thus, a circumferential edge region of the adhesive surface remains free of adhesive. When the retaining element is attached to the side window, the adhesive is distributed over the adhesive surface as a result of the contact pressure. With suitable dimensioning of the amount of adhesive, the adhesive does not escape or only escapes slightly from the intermediate space between the respective contact section and the associated pane surface. In this case, it is unnecessary to seal said intermediate space to prevent the escape of adhesive. Preferably, no measures are therefore taken for sealing the intermediate space, such as temporary application of a sealing element around the contact section. The appropriate amount of adhesive depends on the intended distance between the pane surface and the contact section and on the size of the adhesive surface and can be determined by the person skilled in the art by simple calculations or preliminary tests. Compared to prior art rigid elements, it is a particular advantage of the foldable retaining element according to the invention that the adhesive surfaces are accessible in the open state and the adhesive can be specifically distributed thereon instead of having to be subsequently injected with the help of a sealing element.

In a preferred embodiment of the method, the side window is arranged and fixed in a tool in a specified position, defined, for example, by reference points on the pane. The retaining element is brought, in the open state, into the desired position, for example, with an assembly aid or a robot and folded together there such that the contact sections are connected to the surfaces of the side window. The position of the retaining element is selected such that the securing sections of the completely assembled retaining element are arranged in the desired position relative to the pane.

In an advantageous embodiment of the method, the adhesive is a fast curing adhesive. As a result, the position of the retaining element relative to the side window is fixed sufficiently quickly such that measures for temporary positional stabilization during the curing of the adhesive can be dispensed with. The production process is thus simplified and accelerated.

In an alternative embodiment, the adhesive is a slow curing adhesive. In order to prevent displacement of the retaining element prior to complete curing of the adhesive, measures should be taken for temporary positional stabilization. This can advantageously be achieved by a second adhesive, for example, a hotmelt adhesive that is applied in the edge region of the adhesive surface free of actual adhesive, for example at points in the corners of the adhesive surface. The fast curing adhesive secures the position of the retaining element, while the actual adhesive cures. Since the connection between the side window and the retaining element is usually not subjected to greater forces during the curing than the force of gravity acting on the retaining element, the demands on the adhesive force of the second adhesive are comparatively low.

The retaining element itself is produced by methods customary in the art. Retaining elements made of plastic are preferably made by injection molding; retaining elements made of metal or metal alloys are made, for example, by extrusion, milling, punching, rolling, and/or welding.

The invention moreover includes the use of a side window according to the invention as an openable side window of a motor vehicle, preferably a passenger car, wherein the retaining element is used for securing to a raising mechanism in the vehicle body.

FIG. 1 depicts a plan view of a generic side window I, which is intended as an openable side window for the front side window of a passenger car. Two retaining elements 1, which are intended for connecting to a raising mechanism within the vehicle door, are attached in the region of the lower edge U of the side window. For this, the retaining elements 1 have passages 8 to which the raising mechanism can be secured.

FIG. 2 depicts a cross-section through a side window I with a prior art retaining element 1'. The retaining element 1' has an essentially Y-shaped cross-section. The retaining element 1' comprises two contact sections 2.1', 2.2', which are opposite one another and which are glued to the two surfaces Ia, Ib in the region of the lower edge U of the side window I. The retaining element 1' thus surrounds a region of the lower edge U and a region of the surfaces Ia, Ib adjacent thereto. A securing section 3' that is positioned below the side window I and is directed toward the lower edge U connects to the contact sections 2.1', 2.2'. The securing section 3' has a passage 8' for connecting to the raising mechanism.

In contrast, FIG. 3 depicts a hinged retaining element 1 according to the invention in the open or unfolded state. The retaining element 1 has a first contact section 2.1, to which a first securing section 3.1 is connected via a first step section 5.1. The first contact section 2.1, the first step section 5.1, and the first securing section 3.1 are rigidly connected to one another. The retaining element 1 also has a second contact section 2.2, to which a second securing section 3.2 is connected via a second step section 5.2. The step sections 5.1, 5.2 cause a lateral offset between the respective associated contact section 2.1, 2.2 and the securing section 3.1, 3.2 such that the contact section and the securing section are not in the same plane. The first rigid part of the retaining element 1, consisting of a first contact section 2.1, a first step section 5.1, and a first securing section 3.1, and the second rigid part of the retaining element 1, consisting of a second contact section 2.2, a second step section 5.2, and a second securing section 3.2, are mirror symmetrical to one another. In principle, they result from a prior art retaining element if its securing section were divided in two in the longitudinal direction. Those side edges of the two securing section 3.1, 3.2 that face away from the respective associated step section 5.1, 5.2 with the contact section 2.1, 2.2 are connected to one another via a hinge section 4. The hinge section 4 is bendable and makes it possible for the two parts of the retaining element 1 to be pivoted relative to one another, as a result of which the retaining element 1 can be opened and closed.

The retaining element 1 is made in one piece from glass-fiber-reinforced polyamide 66. The contact section 2.1, 2.2, the securing sections 3.1, 3.2, and the step sections 5.1, 5.2 have a thickness D (material thickness) of 3 mm. In contrast, the hinge section 4 is considerably thinner with a thickness D of 0.25 mm. Due to the different material thicknesses, the hinge section 4 is bendable, whereas the rest of the retaining element 1 is rigid.

The width B of the retaining element 1 is, for example, 80 mm. The length L of the contact sections 2.1, 2.2 is, for example, 30 mm. The length L of the securing sections 3.1, 3.2 is, for example, 50 mm.

Each securing section 3.1, 3.2 has a hole 7.1, 7.2. The holes 7.1, 7.2 are circular and their centers are arranged at the same point in the respective securing section 3.1, 3.2. Thus, in the closed state of the retaining element 1, the holes 7.1, 7.2 coincide concentrically, yielding a passage through the retaining element for securing the raising mechanism.

The hole 7.1 of the first securing section 3.1 has a diameter of 10 mm and is surrounded by a guide element 6. The hole 7.2 of the second securing section 3.2 is somewhat larger with a diameter of 10.4 mm. When the retaining element 1 is folded together, the guide element 6 is inserted into the hole 7.2, as a result of which the two securing sections 3.1, 3.2 are latched to one another.

A layer of an adhesive 9 is applied to the adhesive surfaces of the contact sections 2.1, 2.2 in each case. The adhesive is, for example, DOW Betaforce 9050S with a modulus of elasticity of 400 MPa, elongation at break of 80%, tensile strength of 15 MPa, and pot life of 6 min. The thickness of the adhesive layers before joining is, for example, 4 mm. The adhesive 9 is in each case applied only in a central region of the adhesive surfaces such that a 5-mm-wide circumferential edge region of the adhesive surfaces remains free. When bonding the retaining element 1, the adhesive can be distributed over this free region such that it does not escape from the intermediate spaces between the side window and the contact sections 2.1, 2.2.

Figure 4:
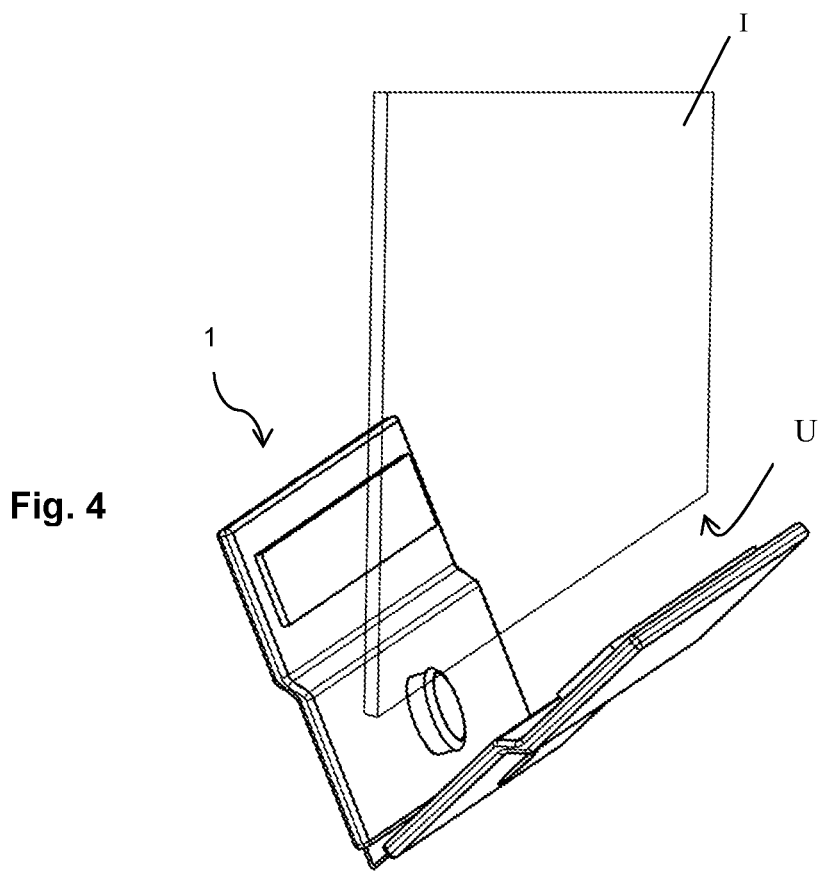

FIG. 4 depicts how the retaining element 1 of FIG. 3 is mounted on the side window I. The retaining element 1, which was provided with the adhesive 9 in the open state, is folded together around the lower edge U of the side window I, i.e., closed. The side window I is, for example, implemented as single-pane safety glass (ESG) made of 3.85-mm-thick soda lime glass. For the sake of simplicity, the side window I is depicted flat in the figure; however, in reality, it has a curvature as is usual for passenger car windows.

Figure 5:
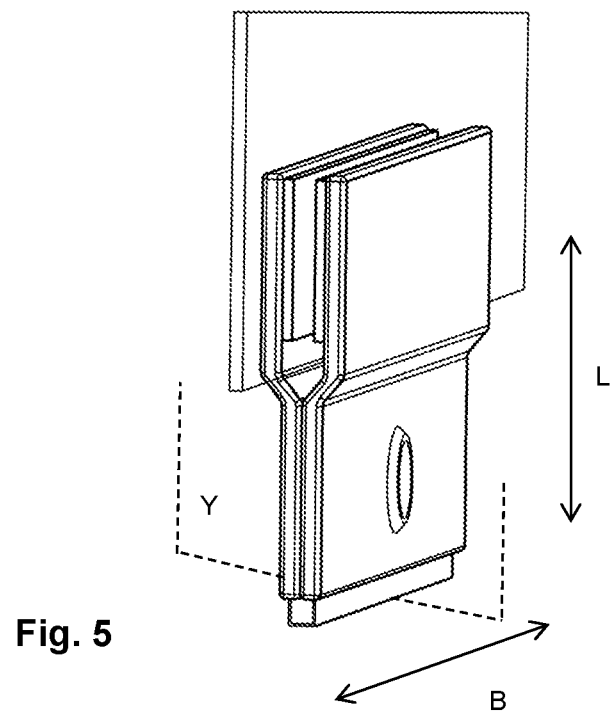

FIG. 5 depicts the retaining element 1 of FIGS. 3 and 4 completely assembled on the side window I. The contact sections 2.1, 2.2 adhere to the surfaces Ia, Ib of the side window I via the adhesive 9. The guide element 6 is arranged within the hole 7.2 and latches the two securing sections 3.1, 3.2 to one another.

In the figure, arrows indicate the dimensions of the width B and the length L in the context of the invention.

Figure 6:
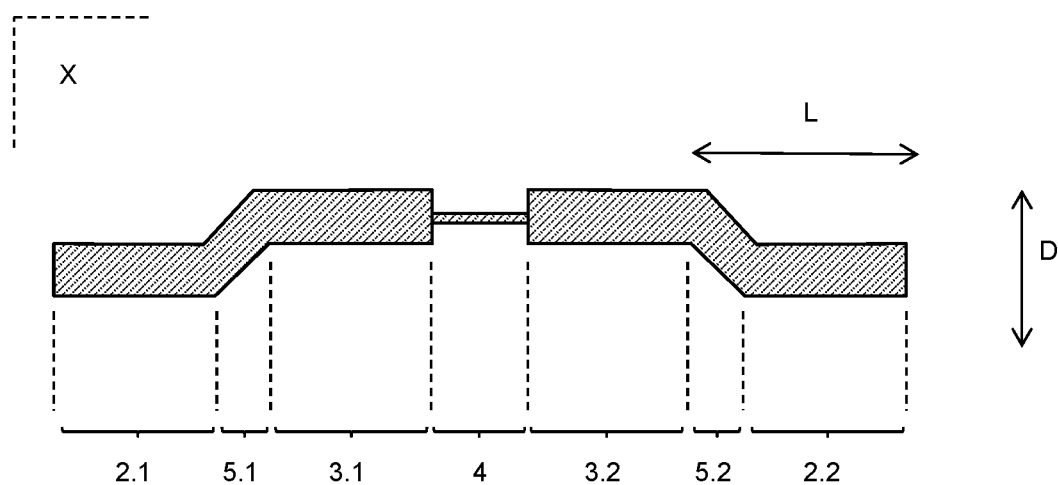

FIG. 6 depicts a cross-section through a retaining element 1 according to the invention in the open state with the first contact section 2.1, the first step section 5.1, the first securing section 3.1, the hinge section 4, the second contact section 2.2, the second step section 5.2, and the second securing section 3.2. The cross-section of FIG. 6 is taken in plane X that is schematically shown in FIG. 3. In addition, the dimension of the thickness D (material thickness) in the context of the invention is depicted.

Figure 7:
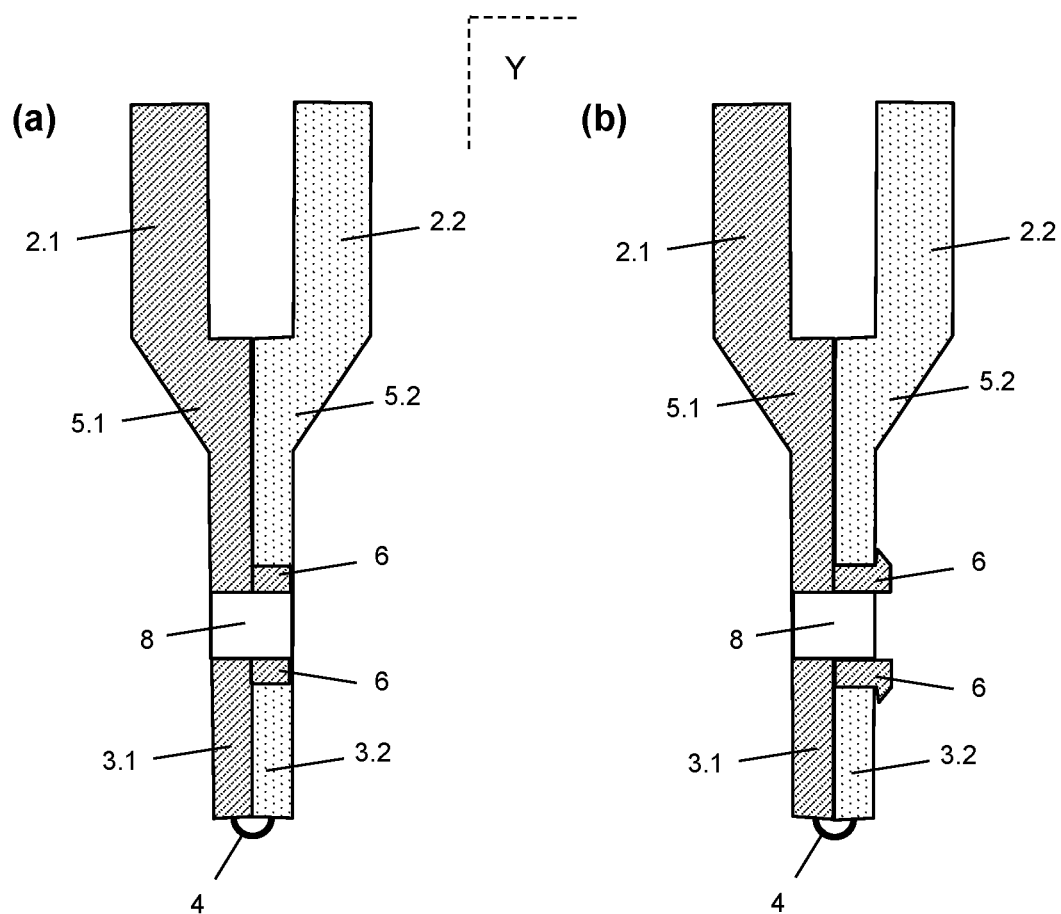

FIG. 7 depicts a cross-section through two retaining elements 1 according to the invention with different guide elements 6. In the case of the retaining element 1 of FIG. 7a, the guide element 6 is designed as a mandrel that extends into the hole 7.2 of the opposite securing section 3.2. The mandrel, in the context of the invention, is an elevation, preferably with a constant width or tapering, which is suitable for insertion into a complementary hole, but which does not have elements that actively prevent its release from the hole. In contrast, in the case of the retaining element 1 of FIG. 7b, the guide element 6 is implemented as a latching hook. It is formed with a barb at its end that counteracts release from the hole. The cross-section of FIG. 7b is taken in plane Y that is schematically shown in FIG. 5. Likewise, the cross-section of FIG. 7a is taken in plane Y that is schematically shown in FIG. 5 and in which the latching hook is replaced with the mandrel.

As shown in FIGS. 3 to 5, the guide element 6, whether designed as a mandrel or as a latching hook, can completely surround the hole 7.1 of the first securing section 3.1. However, alternatively, a plurality of mandrels or latching hooks can be distributed around the hole 7.1.

Figure 8:
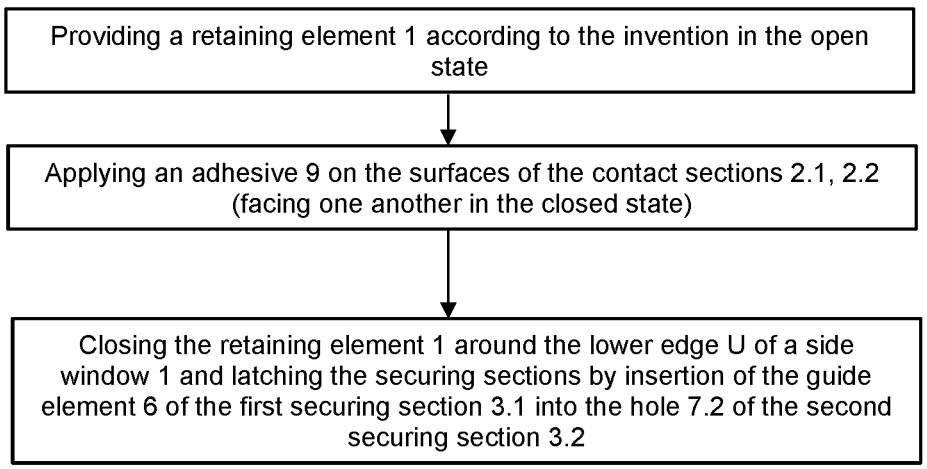

FIG. 8 depicts a flow chart of an exemplary embodiment of the method according to the invention for producing a side window according to the invention with a retaining element.

LIST OF REFERENCE CHARACTERS (1) retaining element for a side window of a vehicle
(2.1) first contact section of the retaining element 1
(2.2) second contact section of the retaining element 1
(3.1) first securing section of the retaining element 1
(3.2) second securing section of the retaining element 1
(4) hinge section of the retaining element 1
(5.1) first step section of the retaining element 1
(5.2) second step section of the retaining element 1
(6) guide element
(7.1) hole in the first securing section 3.1
(7.2) hole in the second securing section 3.2
(8) passage through the securing sections 3.1, 3.2
(9) adhesive
I side window of a vehicle
Ia first surface of the side window I
Ib second surface of the side window I
(O) upper edge of the side window I
(U) lower edge of the side window I
(V) front edge of the side window I
(H) rear edge of the side window I
(1') retaining element according to the prior art
(2.1') first contact section of the retaining element 1'
(2.2') second contact section of the retaining element 1'
(3') securing section of the retaining element 1'
(8') passage through the securing section 3'
(L) length/height
(B) width
(D) thickness/material thickness

The invention claimed is:

1. A side window for a vehicle, having a first surface, a second surface opposite thereto, and a lower edge, and having at least one retaining element attached in a region of the lower edge, the at least one retaining element for a side window of a vehicle, comprising:
a first securing section and a first contact section connected thereto for securing to the first surface of the side window,
a second securing section and a second contact section connected thereto for securing to the second surface of the side window,
wherein the first securing section and the second securing section are connected to one another opposite the first and second contact sections via a hinge section such that the first securing section together with the first contact section and the second securing section together with the second contact section are pivotable relative to one another, whereby the retaining element can be opened and closed so as to place, respectively, the retaining element in an open state and in a closed state,
wherein, in the closed state,
the first and second securing sections are in surface contact with one another and, together, are suitable for securing to the vehicle, and
the first and second contact sections are suitable for securing to the first and second surfaces of the side window,
wherein, by means of an adhesive, the first contact section is secured to the first surface of the side window and the second contact section is secured to the second surface of the side window, and
wherein the retaining element is secured to the side window in the closed state exclusively by the adhesive.

2. The side window according to claim 1, wherein the retaining element is adapted to remain in the open state without action of external forces.

3. The side window according to claim 1, which is formed in one piece, wherein the hinge section has lower material thickness than the first and second securing sections and the first and second contact sections in order to ensure flexibility required for opening and closing the retaining element.

4. The side window according to claim 1, wherein the first and second securing sections have, in each case, a hole and wherein the holes are superimposed on one another in the closed state of the retaining element such that a passage for securing to the vehicle extends through the retaining element.

5. The side window according to claim 4, wherein the hole of the first securing section is surrounded by at least one guide element, which is implemented as a mandrel or latching hook and is inserted into the hole of the second securing section in the closed state of the retaining element.

6. The side window according to claim 1, wherein the first contact section is connected to the first securing section via a first step section and the second contact section is connected to the second securing section via a second step section, and wherein the first and second step sections are substantially identical.

7. The side window according to claim 1, wherein the hinge section has a material thickness of 0.1 mm to 1 mm.

8. The side window according to claim 7, wherein the hinge section has a material thickness of 0.2 mm to 0.5 mm.

9. The side window according to claim 1, wherein a thickness of the adhesive is from 0.5 mm to 5 mm.

10. The side window according to claim 9, wherein the thickness of the adhesive is from 2 mm to 4 mm.

11. The side window according to claim 1, wherein the adhesive has a modulus of elasticity of at least 20 MPa.

12. The side window according to claim 11, wherein the modulus of elasticity is from 400 MPa to 600 MPa.

13. A method for producing the side window having the retaining element for a vehicle according to claim 1, the method comprising:
providing the retaining element and the side window having the first surface, the second surface opposite thereto, and the lower edge,
applying the adhesive to the first and second contact sections of the retaining element in the open state, and
closing the retaining element around the region of the lower edge of the side window, wherein the first contact section is connected to the first surface and the second contact section is connected to the second surface via the adhesive.

14. The method according to claim 13, wherein the adhesive is applied only to a central region of surfaces of the first and second contact sections to be connected to the side window and has a distance from side edges of the first and second contact sections of at least 2 mm.

15. The method according to claim 14, wherein a second adhesive is applied between the adhesive and the side edges of the first and second contact sections, which second adhesive is suitable for temporary stabilization of the retaining element on the side window, until the adhesive is cured.

16. The method according to claim 14, wherein the distance from the side edges of the first and second contact sections is from 2 mm to 10 mm.

17. The method according to claim 13, wherein the adhesive has a curing time of less than 10 min, and wherein no measures for temporary positional stabilization during the curing of the adhesive are taken.

18. A method comprising utilizing the side window according to claim 1 as side window that is openable in said vehicle.

19. The method according to claim 18, wherein the vehicle is a passenger car.

* * * * *